LOGIC CIRCUITS USING NON-LINEAR RESONANCE

Filed Aug. 31, 1959 2 Sheets-Sheet 1

INVENTOR:
RAYMOND C. BASSETT JR.,
BY Walter C. Bernkopf
HIS ATTORNEY.

INVENTOR:
RAYMOND C. BASSETT JR.,
BY Walter C. Bernkopf
HIS ATTORNEY.

3,134,910
Patented May 26, 1964

3,134,910

LOGIC CIRCUITS USING NON-LINEAR RESONANCE

Raymond C. Bassett, Jr., Fayetteville, N.Y., assignor to General Electric Company, a corporation of New York

Filed Aug. 31, 1959, Ser. No. 837,164
2 Claims. (Cl. 307—88)

This invention relates to logic circuits, and more particularly, to logic and memory circuits employing non-linear elements controllably resonant for logic and memory functions.

It is one object of this invention to provide a read-out circuit for generating a character representation of an input signal.

It is a further object of this invention to provide a logic circuit for selectively energizing predetermined output indicators, a plurality of which are arranged in a display, in response to input original coding.

It is a further object of this invention to provide an AND logic circuit comprising a non-linear element.

It is a further object of this invention to provide an OR logic circuit comprising a non-linear element.

It is a further object of this invention to provide a scanned memory matrix employing non-linear elements for a storage function.

Other objects and advantages will be pointed out hereinafter.

In accordance with these objects, there is provided in a preferred embodiment of this invention, a source of alternating voltage across which is coupled a plurality of serially connected capacitors and inductors. Each inductor is wound on a saturable core, on which is also wound a control winding. The core and the control winding are dimensioned so that the core will be driven at least into partial saturation by the application of a control signal of predetermined amplitude and duration to the control winding. The inductive winding and the capacitor are so dimensioned with respect to the source that current flow through the winding is maintained below that which will saturate the core when the control winding is not energized. Upon application of a signal to the control winding, the core will be partially or completely saturated, decreasing the inductance of the inductive winding thereon so that the capacitor and inductor are resonant at the source frequency. The current flow through the serially coupled inductor and capacitor in the resonant state is sufficient to maintain core saturation. An indicator element is coupled across each of said capacitors to provide an output indication when the capacitor voltage rises during resonance of said serially connected inductor and capacitor. The control windings are coupled together to provide a read-out circuit arrangement for energizing said indicator elements in a character representation of the input signal responsive to the input signal coding.

Means are provided to return the circuit to the said resonant condition preparatory to receiving a new input signal.

In one embodiment the control windings are coupled in AND logic circuit arrangements.

In another embodiment the control windings are coupled in OR logic circuit arrangements. Certain embodiments may combine AND and OR logic circuits in series and parallel combination.

In still another embodiment, the control windings are coupled in a matrix.

Preferred embodiments of this invention are illustrated in the accompanying drawings of which:

Figure 1:
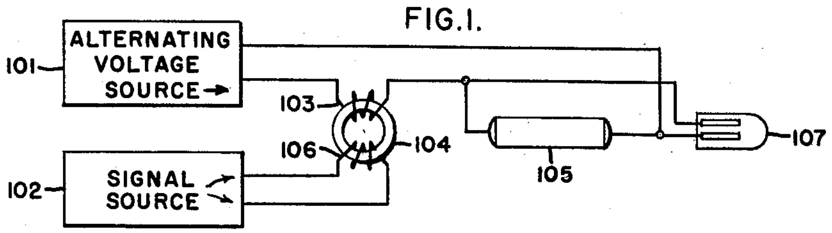
FIGURE 1 is a partial schematic view of a non-linear resonant logic circuit element.

Referring to FIGURE 1 there is shown a source of alternating voltage 101 and a signal source 102. Coupled across the source of alternating voltage is an inductor 103, comprising a winding wound on a saturable core 104, and a capacitor 105. Coupled across a signal source is a control winding 106 which is wound on the same core 104 as is the inductive winding 103. An indicator tube 107 is coupled across the capacitor to provide an indication of circuit operation.

The embodiment shown in FIGURE 1 is particularly advantageous in those applications where it is desirable to convert a decimal or a one-wire signal to a visual representation of the corresponding alpha numerical character. For example, the indicator 107 may be arranged with a plurality of other indicators, similarly connected, with the indicator tubes in a mosaic pattern. The tubes are connected in an array which is fired in response to the signal input. The array presents an outline which represents the specific character contained within the input signal provided by source 102. For example, if the source 102 was dimensioned to selectively apply a signal to indicate the presence of the decimal digit 1, the ionizable indicator 107 would be arranged in a mosaic so that the array of illuminated tubes would present the outline of the decimal digit 1. Such read-out circuitry is particularly advantageous in those applications where the output is to be presented in form directly useable by the operator without interpretation.

Figure 2:
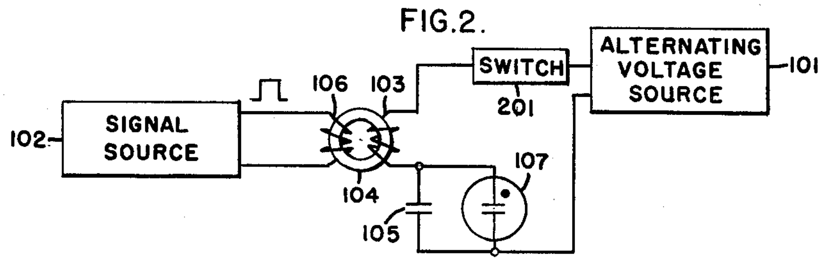
FIGURE 2 is a schematic diagram of the circuit elements shown in FIGURE 1.

The operation of the elements shown in FIGURE 1 is best understood by reference to FIGURE 2 which presents a schematic representation.

In FIGURE 2 there is shown the signal source 102 across which is coupled the control winding 106. The control winding is wound on core 104. An inductive winding 103 is also wound on this core and is serially connected with capacitor 105 across the alternating voltage source 101 through switch 201. Coupled across the capacitor is the ionizable indicator 107.

In the quiescent or rest position the inductor 103 exhibits the high inductance characteristic of a ferrite core inductor. In such condition the current drawn from the alternating voltage source is restricted by the impedance of the serially coupled inductor and capacitor to a value les than that necessary to saturate the core 104. When a signal is applied by source 102 to which the circuit is to respond by generating an output indicated by firing of the indicator 107, the current flowing through the control winding 106 will partially saturate the ferromagnetic core 104. Partial saturation of the core will result in decrease of the impedance of the inductive winding 103. The capacitor 105 is resonant with the inductance winding of 103 in this reduced impedance state. The current drawn from the alternating voltage source 101 thus increases through the resonant circuit to a value sufficient to maintain saturation of core 104.

During current flow in the resonant condition, the voltage across capacitor 105 builds up to a high value in comparison to the voltage thereacross under non-resonant condition. The output indicator 107 is an amplitude responsive device such as an ionizable glow tube which will be fired by the higher amplitude of the voltage appearing across the capacitor during resonance.

Ignition of the indicator to provide the output signal will be maintained even after termination of the signal source pulse. In order to return the circuit to the quiescent position for receipt of further information, a switch 201 is provided which interrupts the voltage applied by source 101. Upon such interruption the core 104 will return to the unsaturated state and upon re-application of the alternating voltage, the circuit will be ready to respond to subsequent input signals.

Exemplary of the component values which may be utlized in such a circuit are the values listed in Table I.

*Table I*

| | |
|---|---|
| Alternating voltage source: | |
| Amplitude | 14 volts. |
| Frequency | $1.7\times10^6$ c.p.s. |
| Signal source | 3 volt pulses. |
| Core | ⅜ in. O.D., ¼ in. I.D., high frequency ferrite. |
| Control winding | 5 turns. |
| Inductive winding | 40 turns. |
| Capacitor | 500 $\mu\mu$f. |
| Indicator tube | neon glow tube. |

Figure 3:
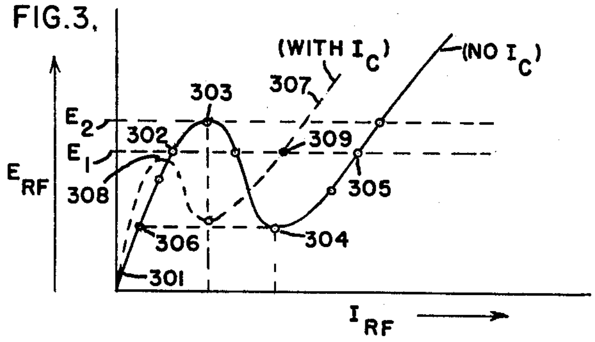
FIGURE 3 is a plot of the operating characteristics of portions of the circuit shown in FIGURE 2 in which voltage is plotted along the scale of ordinates and current is plotted along the scale of abscissa.
Figure 4:
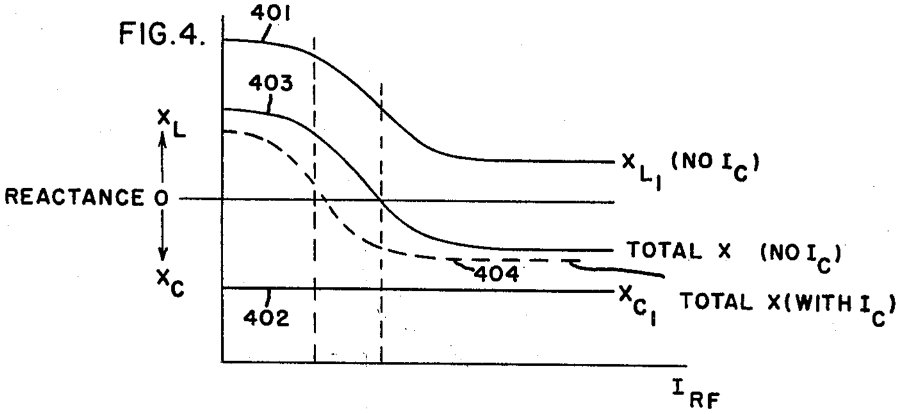
FIGURE 4 is a plot of the reactance of portions of the circuitry shown in FIGURE 2 in which reactance is plotted along the scale of ordinates and current is plotted against the scale of abscissa.

The operation of the circuit shown in FIGURE 2 may best be understood by reference to FIGURES 3 and 4 in which there are plotted various characteristics of the circuit during operation thereof.

In FIGURE 3 there is shown a plot of the alternating voltage from source 101 as a function of the current flow through the inductive winding 103. For convenience the alternating voltage source has been designated as $E_{rf}$ and the current flow resultant therefrom has been designated as $I_{rf}$.

As shown by curve 301 in FIGURE 3, increase in the source voltage from zero results in a corresponding increase in the current flow through the winding 103. The relationship is stable up to point 302 on the curve. That is, the application of voltage of predetermined amplitude will result in a predetermined current flow therethrough. The relationship depends upon the total impedance of the serially coupled inductor and capacitor, which is best shown in FIGURE 4. In FIGURE 4 the reactance of inductance 103 is represented by curve 401. The reactance of the capacitor is plotted as curve 402 and the total reactance plotted as curve 403. If the alternating voltage applied is increased in amplitude to $E_2$, the point 303 on the curve of FIGURE 3 will be reached. At this point the circuit is unstable and current will increase rapidly even with the decrease in source voltage as the core saturates. As can be seen from FIGURE 4, the start of saturation of the core will decrease the inductance which will then be more nearly matched by the reactance of the capacitor. This matching results in decrease in the total reactance and further current increase through the winding. Further decrease in reactance increases the current flow therethrough until, in a regenerative fashion, the core is completely saturated and the current flow is that determined by the resonant circuit. When the circuit reaches the operating point 304, it again becomes stable and further increase in source potential will be matched by an increase in current passing therethrough, the relationship between which is dependent upon the impedance of the respective circuit elements. Thus, it can be seen that for a source voltage of predetermined amplitude, two stable operating points exist as, for example, points 302 and 305, have a source voltage corresponding to $E_1$.

Since the two operating points differ widely in the current flow therethrough at each point, the voltage across the capacitor 105 can be employed to drive an output indicator. The output indicator need only be responsive to a change in amplitude such as an ionizable tube. The ionizable tube is selected so that it will be fired by the voltage across capacitor 105 when circuit operation is at point 305, but will not be fired by the voltage thereacross when the circuit operation is at point 302.

It will be noted that of the source voltage is reduced when the circuit is operating at point 305, current will also reduce proportionately until point 304 is reached. If the amplitude is reduced below that corresponding to point 304 (the dissonate point), saturation current is lost and the impedance of the winding 103 rapidly increases. Increase in the impedance results in a further decrease in current flow therethrough until in a regenerative fashion the circuit is quickly restored to operation at point 306 on the curve.

In many applications such as is illustrated in the circuit of FIGURE 2, it is desirable to operate with a fixed amplitude of the alternating voltage source. To obtain the necessary non-linear resonance, the current flow through the control winding 106 is employed to establish the two selectible operating states of the circuit. In FIGURE 3 there is shown a waveform 307 which is the characteristic waveform of the circuit shown in FIGURE 2 when a current is flowing through the control winding thereof. Similarly, in FIGURE 4 a plot of the total reactance with control current flow is shown as curve 404.

Assume that circuit operation is established at point 302 on curve 301 with the voltage source having an amplitude represented by $E_1$. The application of a signal from source 102 to the control winding 106 will shift the operating curve downward and to the left as shown by curve 307. At this point the applied voltage is above the unstable operating point 308 on curve 307 and the circuit will quickly drive into resonance to stabilize at point 309 on curve 307. Termination of the pulse applied by the signal source 102 will return circuit operation to point 305 on curve 301. The output indication will be maintained even after the termination of the signal from source 102, since the circuit is at a stable operating point. To return the circuit to operating point 302, the source voltage is temporarily interrupted by switch 201. Reapplication of the alternating voltage 101 upon closure of switch 201 will bring the circuit up along the curve to the stable operating point 302 readying the circuit for response to subsequently applied signals.

Thus, it can be seen that the logic circuit has two stable states of operation which can be selected in response to an input signal with a fixed amplitude of the alternating voltage applied. Return to one of the predetermined operating conditions is made by interruption of the voltage applied by the alternating source. It will be understood that the switch 201 may be automatically operated such as by a timing pulse applied from a time base generator synchronized with the source of input signals if the circuit is to be employed as a read-out circuit. It will also be understood that the switch 201 may be an attenuator, bringing the amplitude of the applied alternating voltage below that corresponding to the dissonate point of the curve.

In many applications of the circuit shown in FIGURE 2 as a read-out device such as arranging a plurality of output indicator tubes and the associated circuitry in a mosaic for deriving a character representation of the information contained within the input signal, each indicator lamp must be responsive to a plurality of input signals in order to be fired in arrays giving the proper character representation. In such applications the circuit shown in FIGURE 5 may advantageously be employed.

Figure 5:
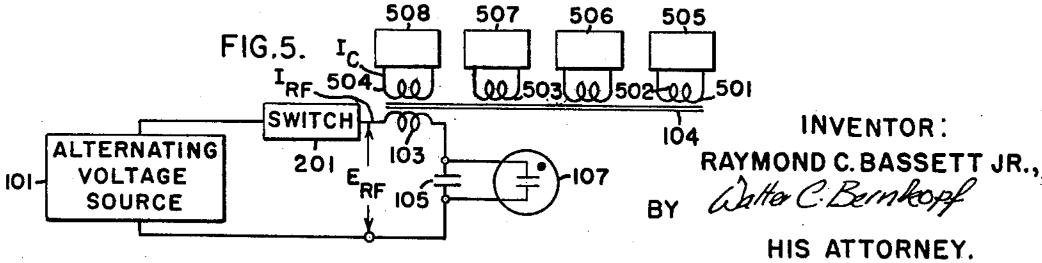
FIGURE 5 is a schematic diagram of another embodiment of a logic circuit utilizing this invention.

In FIGURE 5 there is shown a saturable core 104 having an inductive winding 103 mounted thereon. The inductive winding is serially coupled with a capacitor 105 and coupled through a switch 201 across a source of alternating voltage 101. Control windings 501, 502, 503 and 504 are wound on core 104 and are respectively coupled across signal sources 505, 506, 507 and 508. An output indicator 107 is coupled across capacitor 105.

Each of the control windings 501–504 is dimensioned with respect to the core and to the amplitude of the signal generated by the respective signal sources 505–508 to at least partially saturate the core 104 when a signal is generated by the associated source.

In this manner a circuit shown in FIGURE 5 will be responsive to a plurality of input signals to give a single output signal in response to the application of any one of the input signals. For example, if the output indicator was arranged in a mosaic to give a character representation of the input signal by firing an array of tubes, the outline of which will have a character representation of the input signal, any one tube may be used in more than one array. For example, if the input signals represent decimal digits, the tubes must be ionized in arrays, the outlines of which will represent the decimal digits 0–9. Since each tube will be used in more than one array, it must be responsive to a plurality of input signals dependent upon its position in the mosaic. In such manner I have provided a circuit which is responsive to a plurality of input signals in simple, expedient fashion using solid state components.

In many applications, it is desirable that the read-out device selectively applies an energizing signal to an output indicator in response to a coded input signal. For such applications the circuit shown in FIGURE 6 may advantageously be employed.

Figure 6:
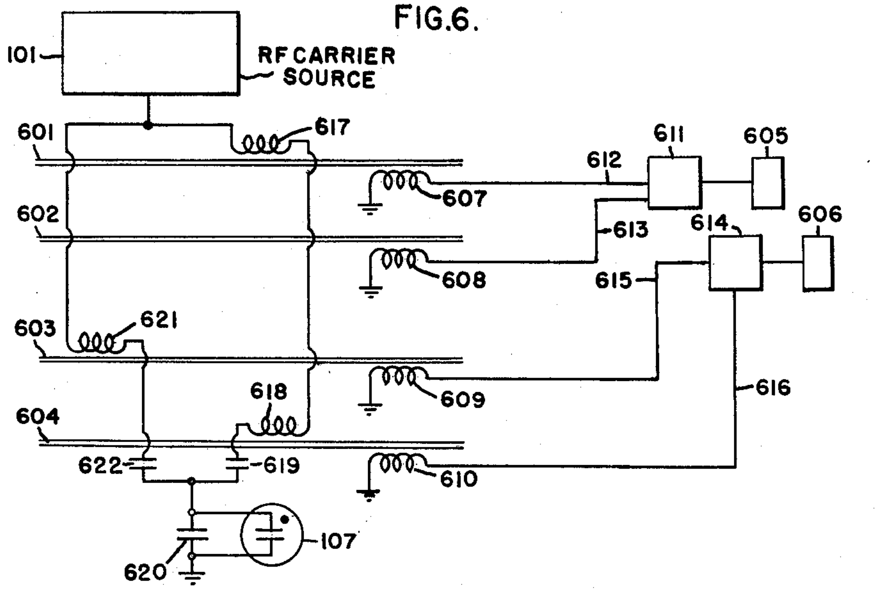
FIGURE 6 is a schematic diagram of a logic circuit providing AND and OR gates.

FIGURE 6 discloses merely a portion of such a matrix in which one indicator lamp, forming an element of specific alpha-numeric characters, is energized when a binary code is applied which corresponds to the characters of which the indicator lamp forms a part. FIGURE 6 illustrates as an example, a two digit portion of a binary input matrix which may be supplied with the following possible codes 00, 01, 10 and 11 and which is connected so that the indicator is energized for each of the inputs, except the input 11. The matrix may of course be designed so as to accommodate a greater digit input and may have logic so as to provide the desired input and output relationship.

In FIGURE 6 there are shown saturable cores 601, 602, 603 and 604. Sources 605 and 606 drive, respectively, selector generators 611 and 614. The selector generators each provide complementary outputs representing a binary 0 and binary 1. Lines 612 and 613 both connected to generator 611, represent 0 and 1, respectively, of the most significant digit. Lines 615 and 616, both connected to generator 614, represent 0 and 1, respectively, of the least significant digit. Lines 612 and 613 are connected, respectively, to control windings 607 and 608 which are in turn associated, respectively, with the "0" responsive core 601 and the "1" responsive core 602. Similarly, lines 615 and 616 are connected, respectively, to control windings 609 and 610, which are, in turn, associated, respectively, with "0" responsive core 603 and the "1" responsive core 604. Thus, winding 607 is energized if the most significant digit is a "0," and winding 608 is energized if it is a "1." Similarly, winding 609 is energized if the least significant digit is a "0," and winding 610 is energized if it is a "1." It will be noted that many operating equipments will directly generate complementary output pulses which may be directly applied to the control windings, so as not to require generators 611 and 614.

A source of alternating voltage 101 is provided across which is coupled a serially coupled path comprising inductors 617, 618, capacitor 619, a balancing reactance to provide proper capacity for resonance, and capacitor 620. This path is called the AND path, and requires saturating both 617 and 618 for series resonance. Coupled across the source 101 is a serially connected inductor 621, capacitor 622 and capacitor 620. This path, which may be termed the OR path, resonates upon saturation of winding 621, i.e., whenever the least significant digit is a "0."

The AND path provides logic which will energize the output indicator 107 in response to code 01 only. For example, assume that the incoming code is 00. Generator 611, in responding to an "0" code applied by source 605, will apply a control pulse to windings 607. If an "0" digit is supplied to generator 614, winding 610 will not be energized. The inductance of inductor 617 will be decreased by the partial core saturation caused by control current in winding 607. However, the inductance of winding 618 will remain high preventing significant increase in the current flow through the AND leg. Therefore, resonance with the serially coupled capacitor is not reached and upon termination of the input signals, cores 617 and 618 will remain unsaturated and no output indication will be derived from the AND path.

However, if the code 01 is applied by the respective signal sources 605, 606, generator 611, responsive to a 0, and generator 614, responsive to 1, will apply control currents to control windings 607 and 610 simultaneously. Since the inductance of both control windings 617 and 618 are reduced, current flow will increase until self-saturation is reached. Saturation current flow will generate a high voltage across capacitor 620 which will ionize the output indicator 107.

Thus, the AND path will provide an output indication only when two preselected input signals are applied simultaneously.

The OR leg, having single control winding 621 on core 603 will go into resonance upon the application of code 00 or code 10 by the respective sources 605 and 606. Thus, the OR path will provide an output indication when one of two preselected input signals are applied.

It will be noted that the logic function may be extended to a plurality of input signals.

In the above-described embodiments, change of circuit operation from one stable condition to another has been effected by a signal applied to a control winding. It will be noted that the same control could be effected by variation of the amplitude of the alternating voltage. It is usually more expedient in non-scanned applications to use an alternating voltage of predetermined amplitude. However, in applications requiring scanning, such as information storage on a matrix, variation in source amplitude is employed advantageously. In such applications the circuit shown in FIGURE 7 may advantageously be employed.

Figure 7:
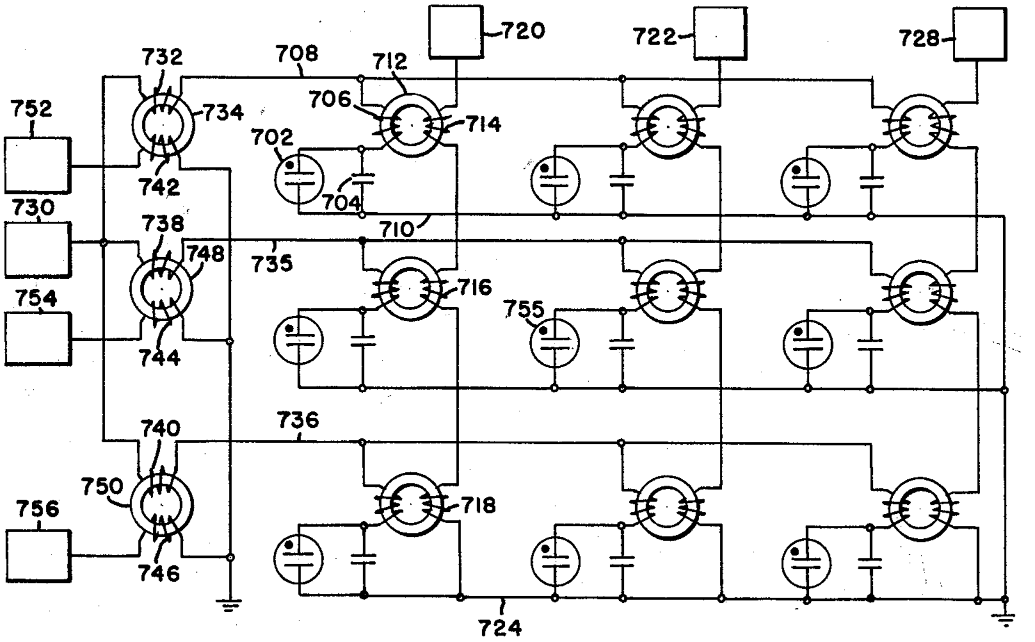
FIGURE 7 is a schematic diagram of a matrix embodying this invention.

In FIGURE 7 there is shown a plurality of ionizable indicator tubes 702 arranged in an exemplary 3 by 3 mosaic. Each tube is coupled across a capacitor 704 which is serially coupled with an inductor 706 between a potential buss 708 and a ground buss 710. The inductor 706 is wound on a saturable core 712 on which is also wound a control winding 714.

The control windings 714, 716 and 718 of each core in the first column are serially coupled between a source 720 and a ground buss 724. Similarly, sources 722 and 728 are coupled across the serially coupled control winding of the other columns. Applied to the buss 708, associated with the top row, is an RF potential applied from source 730 through a winding 732 wound on a saturable reactor core 734. Similarly, RF potential is applied to the busses 735 and 736 with the other rows through windings 738 and 740 respectively. Control windings 742, 744 and 746 are applied to cores 734, 748 and 750 respectively and are coupled between scanning sources 752, 754 and 756 respectively.

In the normal condition the cores 734, 748 and 750 are unsaturated and the inductance of the associated windings 732, 738 and 740 respectively is high, reducing the amplitude of the potential applied to the respective potential busses 708, 735 and 736.

To scan the matrix for insertion of information for presentation on illuminated indicator lamps 702, the scan sources 752, 754 and 756 will sequentially generate pulses. The pulse output from each source 752, 754 and 756 will saturate the associated core 734, 748, 750, decreasing the inductance of the respective inductive winding 732, 738 and 740. Thus the amplitude of the alternating potential applied to the row potential buss is increased periodically in sequence. The potential increase by itself is insufficient to saturate any of the cores in a row so that scanning by the potential increase alone will not change the matrix condition.

Signals from signal sources 720, 722 and 728 are applied to each column synchronously with the potential scan. The signals in the usual application comprise pulses having predetermined amplitude when a signal is to be stored and zero amplitude in the absence of information. The pulse alone is insufficient to saturate any of the cores in a column.

However, at the intersection of a row and a column, the additive effect of potential increase and a signal applied to the control winding will start the core into saturation and circuit operation will switch to the stable state of operation in which the associated indicator is illuminated. Thus, by synchronizing the potential and signal scans through a common time base generator in manner known to the art, information can be selectively stored at predetermined positions in the matrix.

At the completion of a cycle of information storage, the source voltage 730 is interrupted to clear the matrix, returning each core to the unsaturated state.

The invention may be variously modified and embodied within the scope of the subjoined claims.

What I claim and desire to secure by Letters Patent of the United States is:

1. An AND logic circuit to generate an output signal in response to the application of all of a predetermined plurality of input signals, comprising a plurality of ferromagnetic cores, each of said cores having a control winding and an inductor winding wound thereon, a plurality of input signals including said predetermined plurality of input signals, means coupling each of said predetermined plurality of input signals to a corresponding control winding, a source of alternating voltage, a capacitor, indicator means coupled across said capacitor, means serially coupling all inductor windings on the cores to which said predetermined plurality of signals were coupled and said capacitor across said voltage whereby said indicator means provides an indication when said predetermined plurality of input signals are applied simultaneously.

2. A logic circuit in accordance with claim 1 in which each of said cores is dimensioned to be driven into partial saturation by the application of said input signal to the control winding thereof.

References Cited in the file of this patent

UNITED STATES PATENTS

| | | |
|---|---|---|
| 2,682,615 | Sziklai et al. | June 29, 1954 |
| 2,697,178 | Isborn | Dec. 14, 1954 |
| 2,721,947 | Isborn | Oct. 25, 1955 |
| 2,822,480 | Isborn | Feb. 4, 1958 |
| 2,840,801 | Beter | June 24, 1958 |
| 2,888,645 | Hoft | May 26, 1959 |
| 2,919,354 | Russell | Dec. 29, 1959 |
| 2,925,500 | Meyerhoff | Feb. 16, 1960 |
| 2,928,080 | Auerbach | Mar. 8, 1960 |
| 3,002,184 | Proebster | Sept. 26, 1961 |